United States Patent
Chanthet et al.

(10) Patent No.: US 12,265,868 B2
(45) Date of Patent: Apr. 1, 2025

(54) DOCUMENT WITH SHIELDING

(71) Applicant: LINXENS HOLDING, Mantes-la-Jolie (FR)

(72) Inventors: Kachen Chanthet, Amphor Pakham Buriram (TH); Lars Klemm, Dresden (DE)

(73) Assignee: LINXENS HOLDING, Mantes-la-Jolie (FR)

( * ) Notice: Subject to any disclaimer, the term of this patent is extended or adjusted under 35 U.S.C. 154(b) by 4 days.

(21) Appl. No.: 17/927,274

(22) PCT Filed: May 28, 2020

(86) PCT No.: PCT/IB2020/000615
§ 371 (c)(1),
(2) Date: Nov. 22, 2022

(87) PCT Pub. No.: WO2021/240199
PCT Pub. Date: Dec. 2, 2021

(65) Prior Publication Data
US 2023/0196051 A1    Jun. 22, 2023

(51) Int. Cl.
*G06K 19/06* (2006.01)
*G06K 19/073* (2006.01)
*G06K 19/077* (2006.01)

(52) U.S. Cl.
CPC . *G06K 19/07327* (2013.01); *G06K 19/07749* (2013.01)

(58) Field of Classification Search
CPC ......... G06K 19/07749; G06K 19/0723; G06K 19/077; G06K 19/07; G06K 19/07327; G06K 7/10336; G06K 19/18

USPC .................................................. 235/487, 492
See application file for complete search history.

(56) References Cited

U.S. PATENT DOCUMENTS

| | | | |
|---|---|---|---|
| 7,875,975 B2 * | 1/2011 | Bernds | G06K 19/07783 257/788 |
| 2005/0128085 A1 * | 6/2005 | Bon | B42D 25/00 340/572.7 |
| 2006/0097849 A1 * | 5/2006 | Dando | G06K 19/07749 340/572.1 |
| 2007/0164866 A1 | 7/2007 | Robin et al. | |
| 2008/0186186 A1 | 8/2008 | Campbell | |
| 2010/0141547 A1 | 6/2010 | Bombay et al. | |

(Continued)

FOREIGN PATENT DOCUMENTS

| | | |
|---|---|---|
| CN | 1947137 A1 | 4/2007 |
| EP | 1884887 A1 | 2/2008 |
| KR | 20100005270 A | 1/2010 |

OTHER PUBLICATIONS

International Search Report and Written Opinion of the International Searching Authority for related International Application No. PCT/IB2020/000615, dated Jan. 22, 2022, 9 pages.

*Primary Examiner* — Daniel St Cyr
(74) *Attorney, Agent, or Firm* — DITTHAVONG, STEINER & MLOTKOWSKI

(57) ABSTRACT

In an aspect, the present invention provides a document, comprising an RFID inlay, a shield element and a support portion, wherein the shield element, the support portion, and the RFID inlay are provided in a stack configuration. Herein, the shield element and an antenna of the RFID inlay are only partially overlapping each other.

17 Claims, 4 Drawing Sheets

(56) References Cited

U.S. PATENT DOCUMENTS

2011/0147467 A1\* 6/2011 Choi .................... H01Q 9/24
                                                                                     29/601
2017/0032231 A1\* 2/2017 Chapman ......... G06K 19/07327
2019/0073494 A1\* 3/2019 Colby ................ G06Q 20/4012
2019/0392283 A1\* 12/2019 Finn ................... G06K 19/0723

\* cited by examiner

DOCUMENT WITH SHIELDING

FIELD OF THE INVENTION

The present invention relates to a document with an RFID inlay and a shield element. Particularly, the present invention relates to a document, which is a booklet with an RFID inlay and a shield element, such as an identity document booklet having an RFID inlay and a shield element.

BACKGROUND ART

Increasingly, security documents of the identity document type, such as identity document booklets (e.g., passports), identity cards, and the like, include an electronic circuit with contactless reading. The electronic circuit comprises an electronic module or chip connected to an inductive or capacitive antenna. This type of device can be used, for example, to store personal data concerning civil status and biometric data, as well as administrative data in digital form.

When security documents are to be checked for verifying its validity, the stored data is read by a receiving device or reader by means of a remote electronic coupling between the electronic circuit of a security document, often referred to as a transponder, and the reader. The use of contactless technologies provides significant advantages in lifetime and ergonomic terms. However, it is important to ensure that an unintended reading of the identity document cannot take place, particularly, that the security document is not read without the knowledge of the holder of the security document. In practice, a contactless technology in security documents may be more acceptable when the authorization to read data stored in the document remains under the control of the document holder.

An existing solution is the use of a passive element for masking the antenna of the security document, such as in terms of an electromagnetic shielding bag. In practice, the security document to be protected from unintentional reading is placed in the electromagnetic shielding bag and only removed from the electromagnetic shielding bag when the holder of the security document intends to present the security document to a reading device.

In fact, the usage of a passive element for masking the antenna, such as an electromagnetic shielding bag, requires the additional task of removing the security document from the shielding bag when presenting the security document. This additional task may impose a significant inconvenience for the holder of the security document and, therefore, may be considered as a suboptimal solution, especially in the mass market where users frequently forego such inconveniences.

Document US 2007/0164866A11 shows a security document having a contactless chip with data masking. The security document comprises a transponder of an electronic module connected to an antenna placed on a given surface of a first part of the document, wherein the transponder serves to remotely communicate with a reader via an electromagnetic coupling. Furthermore, the security document comprises a passive masking element for the antenna, wherein the passive masking element is supported by a second part of the document and can move relative to the first part. The masking element is capable of interfering with the coupling between the transponder and the reader for rendering the reading of the document impossible when the second part is in a predetermined position that corresponds to a closed position of the document.

In view of the above-discussed background art, it is desirable to provide a document with a shielding function that ensures that only an authorized reader may read the document and inhibits unintended reading by others than the authorized reader when allowing the authorized reader to read the document.

SUMMARY

The above-indicated problems and objects are solved by a document as defined in independent claim 1. More advantageous embodiments are defined in the dependent claims 2 to 17.

In an aspect, the present invention provides a document. In illustrative embodiments, the document comprises an RFID inlay, a shield element and a support portion, wherein the shield element, the support portion, and the RFID inlay are provided in a stack configuration. Herein, the shield element and an antenna of the RFID inlay are only partially overlapping each other. Accordingly, a directivity for reading the document via the RFID inlay is achieved by the partial overlapping of the antenna by the shield element. This means that only reading of the document in a limited solid angle region is allowed by the shield element. It may thus be ensured that only an authorized reader may read the document when the holder of the document presents the document to the authorized reader, while unintended reading by others than the authorized reader outside of the limited solid angle region is inhibited in a situation when the authorized reader is allowed to read the document.

In some illustrative embodiments of this aspect, the shield element may be arranged in between the support portion and the RFID inlay. Accordingly, a document with improved directivity may be provided in an easy manner.

In some alternative embodiments of the illustrative embodiments above, the shield element may partially overlay the antenna. Additionally or alternatively, the antenna may be provided in and/or on an antenna portion of the RFID inlay and the antenna portion of the RFID inlay may be arranged directly on the support portion, for example, in between the shield element and the support portion. Accordingly, a document with improved directivity may be provided in an easy manner.

In some illustrative embodiments of this aspect, a quotient of a width of the shield element to a width of the document may be in a range from about 0.1 to about 0.8 or in a range from about 0.3 to about 0.6 or in a range from about 0.34 to about 0.57 or in a range from about 0.1 to 0.3 or in a range from about 0.17 to 0.28. According ranges define an advantageous overlapping of the shield element and the RFID inlay for achieving an advantageous directivity in a limited solid angle range.

In some illustrative embodiments of this aspect, an amount of overlapping of the antenna and the shield element and/or a width of the shield element depend on a thickness of the document. For example, the amount of overlapping and/or the width of the shield element may be indirectly proportional to the thickness of the document when one document has a thickness different from another document of this type. Accordingly, a directivity may be appropriately defined in dependence on a thickness of these documents. In accordance with some illustrative examples, the thickness of the document may depend on a number of pages of the document and/or a thickness of the support portion and/or a thickness of the shield element and/or a thickness of the RFID inlay.

In some illustrative embodiments of this aspect, at least one of the shield element and the antenna may comprise a metal material, such as AB13AL, aluminum, copper and silver which represents an advantageous conductive material to be used as shielding material and absorber. Accordingly, an advantageous shielding or antenna may be realized. For example, the shield element and/or antenna may be formed by one of a metallic foil disposed over the support portion and a metallic ink printed onto the support portion. In some illustrative examples herein, the shield element may comprise a grid pattern having a line width in the range from about 100 μm to about 500 μm, thereby allowing a beneficial shielding performance.

In some illustrative embodiments of this aspect, at least one of the shield element and the antenna may have a thickness of at most 100 μm. Such a shield element shows an advantageous shielding function at comparatively low cost without creating an uneven surface of the document due to an extensive stepping in the surface of the document, while such an antenna shows an advantageous antenna function at comparatively low cost without creating an uneven surface of the document due to an extensive stepping in the surface of the document.

In some illustrative embodiments of this aspect, the document may be provided in form of a booklet having a booklet cover, the booklet cover corresponding to the support portion and comprising a front cover part, a back cover part, and a booklet cover hinge, the front cover part and the back cover part being connected via the booklet hinge. Herein, the shield element is arranged over one of the front cover part and the back cover part. Accordingly, the document may be advantageously provided as a booklet, such as an identity booklet, e.g., a passport, having advantageous directivity for reading the RFID inlay of the booklet despite of the shield element used for shielding the booklet.

In some illustrative examples herein, the RFID inlay may be of a size greater than the one of the front cover part and the back cover part, the RFID inlay being laminated together with the booklet cover and the shield element, the document further comprising an additional shield element, the additional shield element being arranged on the other one of the front cover part and the back cover part. For example, the RFID inlay may be laminated together with the additional shield element on the other one of the front cover part and the back cover part. Accordingly, a state of complete shielding of the RFID inlay in the booklet and a state of a partial shielding with improved directivity may be realized when closing and opening the booklet.

In some illustrative examples herein, the document may have at most 32 pages enclosed by the booklet cover and a width of the shield element may be greater than about 40 mm or greater than about 45 mm or equal to about 50 mm, depending on the number of pages. Accordingly, an advantageous sizing of the shield element may be obtained for obtaining an improved directivity in dependence on the thickness of the booklet.

In some other illustrative examples herein, the document may have more than 32 pages enclosed by the booklet cover and a width of the shield element may be smaller than about 40 mm or smaller than about 35 mm or equal to about 30 mm, depending on the number of pages. Accordingly, an advantageous shielding may be provided for documents having more than 32 pages.

In illustrative examples, in which the document may have at most 32 pages, a quotient of a width of the shield element to a width of the booklet cover may be greater than about 0.22 or greater than about 0.25 or equal to about 0.28 or 0.29, depending on the number of pages.

In illustrative examples, in which the document may have more than 32 pages enclosed by the booklet cover and a quotient of a width of the shield element to a width of the booklet cover may be smaller than about 0.22 or smaller than about 0.20 or equal to about 0.16 or 0.17, depending on the number of pages.

BRIEF DESCRIPTION OF THE DRAWINGS

The present invention will be explained in greater detail with regard to the accompanying drawings in which:

FIG. 4b schematically illustrates a top view on the inside of a cover of the document in FIG. 4a;

DETAILED DESCRIPTION

Figure 1:
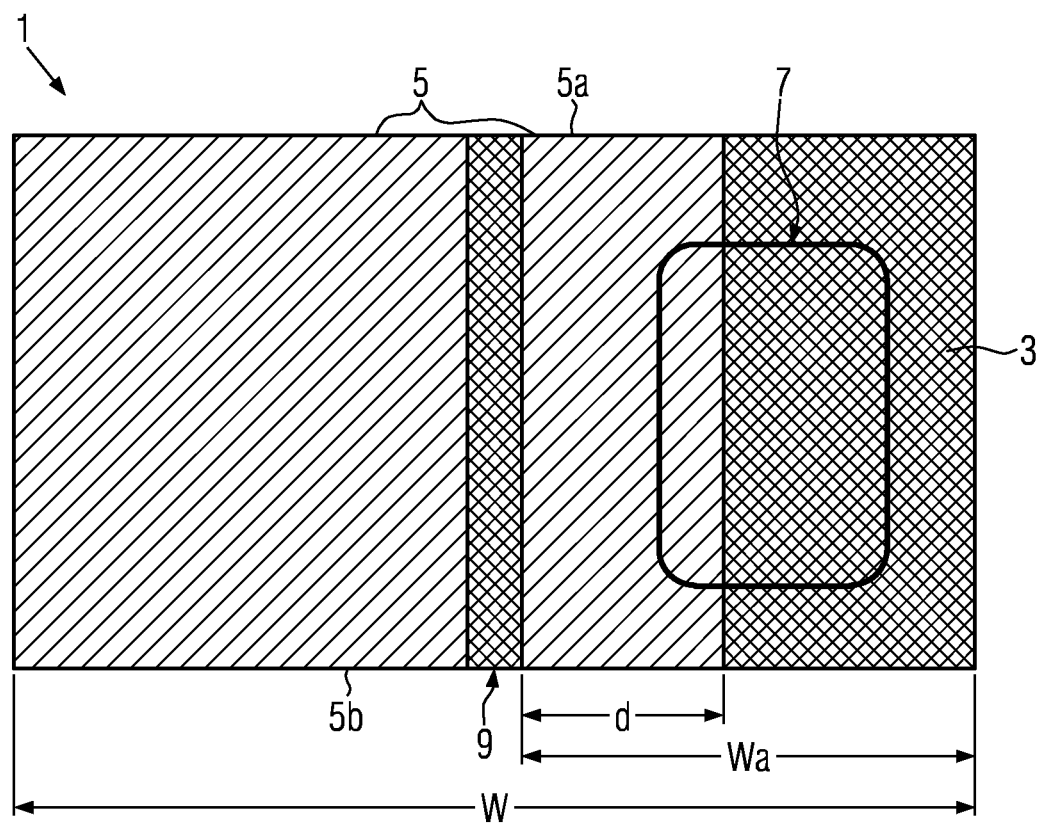
FIG. 1 schematically illustrates, in a top view, a document in accordance with some illustrative embodiments of the present invention.

Referring to FIG. 1, a document 1 comprising an RFID inlay 3, a shielding 5, and a support portion 11 is schematically shown, wherein the shielding 5, the support portion 11, and the RFID inlay 3 are provided in a stack configuration. Furthermore, the shielding 5 and an antenna of the RFID inlay 3 are only partially overlapping each other.

In accordance with some illustrative examples, the support portion 11 may comprise at least one of a piece of paper, a piece of cardboard, a piece of paperboard, a piece of millboard, a piece of pasteboard, a piece of corrugated fiberboard, a board of polycarbonate material and a paper-based material and a synthetic fiber paper and/or the like. For example, synthetic fiber paper may be understood as representing a non-cellulosic sheet material resembling paper and used in a similar fashion, typically made from thermoplastic materials such as polyolefins, nylon, polystyrene, etc., by direct film or foil extrusion or by bonding filaments thereof. Additionally or alternatively, synthetic fiber paper is understood as representing a category of paper that is made without any wood fibers and is especially formulated to be receptive to commercial printing inks. In any way, synthetic fiber paper differs from a plastic film with respect to printing characteristics and it differs from traditional paper due to the lack of wood fibers. In other words, synthetic fiber paper is considered as being a paper-like film that lies somewhere between traditional plastic films and high-value paper. As opposed to traditional paper, synthetic fiber papers use a plastic resin backbone rather than the pulped wood fibers used in traditional paper. However, synthetic fiber papers and traditional papers both use mineral fillers and optical brighteners to gain opacity, brightness and smoothness. Therefore, printability characteristics for synthetic fiber papers and traditional papers formed of a wood pulp are comparably developed by the use of calendering rolls and imparting surface printability enhancements.

In accordance with some illustrative examples, the support portion 11 may be a continuous sheet of material. For example, the support portion 11 may be may be a continuous sheet of material having substantially a homogeneous thickness and/or a homogeneous stiffness. The expression "homogeneous stiffness" means that the support portion 11 may not be folded without permanently deforming the support portion 11. In this case, the document 1 may be a card.

In accordance with some illustrative examples, the shielding 5 may have a thickness of at most 100 μm. For example, the thickness of the shielding 5 may be in the range from about 1 μm to about 100 μm. The person skilled in the art will appreciate that the upper limit of 100 μm for the thickness of the shielding 5 may not be considered as limiting the invention to this thickness. However, in addition to aesthetic reasons according to which it may be desirable to reduce an amount of possible stepping in the document's surface due to the presence of the shielding 5, it is cost efficient and allows to saves resources when optimizing the thickness of the shielding 5 to an thickness range in which a required minimum shielding performance is realized, while reducing the amount of materials employed in the preparation and attachment of the shielding 5 over the support portion 11. For example, aside from reducing the amount of material used for preparing the shielding 5, an amount of adhesive means used for attaching the shielding 5 over the support portion 11 may be reduced, as well. Furthermore, a risk of unintentional damage of the document 1 due to a stepping of more than 100 μm caused by the shielding 5 formed over the support portion 11 may be reduced. Regarding a lower limit of the thickness of the shielding 5, the inventors observed that a shielding performance of a shielding having a thickness of less than 1 μm may not be sufficiently high to ensure a required shielding performance.

Referring to the shielding 5 of the document 1 shown in FIG. 1, the stacked configuration of the shielding 5, the support portion 11, and the RFID inlay 3 may be realized in different ways. With regard to FIGS. 1 and 2, some illustrative embodiments having a first exemplary stacked configuration will be described.

Figure 2:
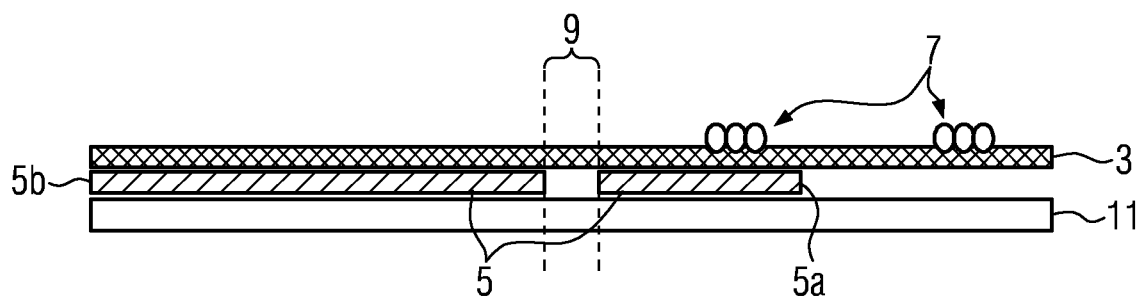
FIG. 2 schematically illustrates a cross-sectional view of FIG. 1.

Referring to FIGS. 1 and 2, the shielding 5 may be arranged in between the RFID inlay 3 and the support portion 11. For example, the support portion 11 may support the shielding 5 and the RFID inlay 3 which are arranged over the support portion 11. For example, the support portion 11, the shielding 5 and the RFID inlay 3 may be laminated together. Alternatively, when referring to FIGS. 1 and 3, the RFID inlay 3 may be arranged at least partially in between the shielding 5 and the support portion 11. In accordance with some special illustrative embodiments, the shielding 5 may be one of a metallic foil, such as a foil made of aluminum, copper and the like, attached to the support portion 11 and a metallic ink printed onto the support portion 11, such as a silver ink or paste. For example, the metallic foil may be attached by means of a heat-activated glue or a cold glue or by means of hot or cold roll lamination techniques. In accordance with some preferred but not limiting examples herein, an aluminum foil may be used for providing the shield 5, the aluminum foil representing a cost efficient material when compared to other materials employed as conductive coatings used for EM and RF shielding, such as copper and silver.

In accordance with some special advantageous, but not limiting embodiments of the present disclosure, a metallic foil may be provided by forming a thin layer of metal on a carrier material, such as a PET material. For example, as a metal material for the thin layer of metal, aluminum, copper, silver and the like may be used. Furthermore, the accordingly provided metallic foil may have an optional adhesive layer bonded thereon, such that the metallic foil together with the adhesive layer may be attached on the support portion 11 by means of the adhesive layer and, optionally, the carrier material may be removed after attachment of the metallic foil on the support portion 11, thereby leaving the thin layer of metal on the support portion 11 attached thereto with the adhesive layer. In case that the carrier layer is not removed, the carrier layer may provide an improved bonding strength to subsequently formed layers on the shield 5.

In accordance with some special illustrative examples, the support portion 11 may be provided by a synthetic fiber paper material as described above. In this case, it is possible to attach a thin metallic foil on the support portion 11 in a comparatively smooth manner when compared to a case in which the support material 11 comprises traditional paper material where a thin metallic foil attached to the support material 11 is creased, thereby impairing bonding of subsequent layers on the shield 5.

Referring to FIG. 1, the shielding 5 comprises a shield element 5a which only partially overlaps with an antenna 7 of the RFID inlay 3. Aside from the antenna 7, the RFID inlay 3 may further include a chip device (not illustrated) and a memory device (not illustrated) which may save personal data of the holder of the document 1, such as identity data of the holder, bank data of the holder, security data of the holder. The memory device (not illustrated) may be only readable or may be readable and writable with new information input by the holder of the document 1. The shield element 5a may be one of a metallic foil and a metal plate and a metal grid. For example, a metallic foil may have a continuous metal layer or a grid patterned metal layer for implementing the shield element 5a. A metal grid may be formed to have a line width in the range from about 100 μm to about 500 μm, preferably in the range from about 100 μm to about 300 μm, more preferably in the range from about 150 μm to about 250 μm, such as at about 200 μm. The person skilled in the art will appreciate that a fine line width may be formed in an easy and reliable manner on a material other than a traditional paper material, such as a synthetic fiber paper. In an explicit illustrative but not limiting example, at least one of the shielding 5, i.e., the shield element 5a, and the antenna 7 may be given by a metallic foil (e.g., a metallic foil made from copper, aluminum or the like) or a printed metallic ink (e.g., a silver ink or the like), having a thickness in the range from about 1 μm to about 100 μm as described later in greater detail.

In accordance with some illustrative examples, the antenna 7 may have a thickness of at most 100 μm. For example, the thickness of the antenna 7 may be in the range from about 1 μm to about 100 μm. The person skilled in the art will appreciate that the upper limit of 100 μm for the thickness of the antenna 7 may not be considered as limiting the invention to this thickness. However, in addition to aesthetic reasons according to which it may be desirable to reduce an amount of possible stepping in the document's surface due to the presence of the antenna 7, it is cost efficient and allows to saves resources when optimizing the thickness of the antenna 7 to an thickness range in which a required minimum performance of the antenna is realized, while reducing the amount of materials employed in the preparation and attachment of the antenna 7 over the support portion 11. For example, aside from reducing the amount of material used for preparing the antenna 7, an amount of adhesive means used for attaching the antenna 7 over the support portion 11 may be reduced, as well. Furthermore, a risk of unintentional damage of the document 1 due to a stepping of more than 100 μm caused by the antenna 7 formed over the support portion 11 may be reduced. Regarding a lower limit of the thickness of the antenna 7, the inventors observed that a performance of an antenna having a thickness of less than 1 μm may not be sufficiently high to ensure a required performance of the antenna 7.

In accordance with some illustrative embodiments and with continued reference to FIG. 1, the shielding 5 may further comprise an additional shield element 5b which may be provided on the support portion 11, wherein the additional shield element 5b is arranged on the support portion 11 with a spacing 9 relative to the shield element 5a. The spacing 9 may be located at the center portion of the document 1 and, in accordance with some illustrative but non-limiting examples herein, may comprise a hinge portion or fold. In case that the spacing 9 comprises a hinge portion or fold, the document 1 may be folded at the spacing 9, such that the part of the support portion 11 supporting the shield element 5a and the remaining part of the support portion 11 on the other side of the spacing 9 may be folded on top of each other. It is noted that the additional shield element 5b is not construed as limiting to the invention and the additional shield element 5b may be omitted instead, in which case the shielding is only realized by the shield element 5a. Furthermore, the spacing 9 may or may not comprise a hinge portion or fold, independent of the presence of the additional shield element 5b. The additional shield element 5b may be one of a metallic foil and a metal plate and a metal grid. For example, a metallic foil may have a continuous metal layer or a grid patterned metal layer for implementing the additional shield element 5b.

In accordance with some illustrative embodiments and referring to FIGS. 1 and 2, the additional shield element 5b may be arranged on top of the antenna 7 such that the antenna 7 is sandwiched between the shield element 5a and the additional shield element 5b in case that the spacing 9 comprises a hinge portion or fold.

In some special illustrative but not limiting embodiments, the antenna 7 may be provided by means of a metallic foil which is prepared as described above with regard to the shield 5. For example, a metallic foil as described above may be subjected to an etching process such that the thin layer of metal on the carrier material of the metallic foil may be etched such that an etched metal material left on the carrier material after etching realizes an antenna pattern providing the antenna 7 when attaching the metallic foil on the RFID inlay 3.

Referring to FIG. 1, the shield element 5a is arranged on the support portion 11 with regard to the antenna 7 of the RFID inlay 3 such that the shield element 5a partially overlaps the antenna 7 in the top view of FIG. 1. In FIG. 1, a width of the first shield element 5a is indicated by reference numeral d, a width of the part of the document at one side of the spacing 9 is indicated by reference numeral Wa and a width of the entire document 1 is indicated by reference numeral W. It is noted that, when referring to a width, this is defined as a dimension measured along a direction perpendicular to a direction along which a maximum dimension of the spacing 9 is oriented. For example, the width may be measured along a direction perpendicular to a fold line (not illustrated). As an alternative formulation, a width may be considered as representing a dimension representing a maximum dimension of the document 1 and a width may represent a dimension perpendicular to a maximum dimension of the shield element 5a. In accordance with an explicit illustrative example as illustrated in FIG. 1, the width Wa is given by the dimension of a part of the document 1 beginning at a left-handed edge of the shield element 5a (an edge of the shield element 5a bordering the spacing 9) to the right-handed edge of the document 1 in the illustration of FIG. 1.

In accordance with some illustrative embodiments, each of a quotient of the width d to the width Wa and a quotient of the width d to the width W and a quotient of a width of the shielding 5 to the width W may be in the range from about 0.1 to about 0.8. For example, a quotient of a width of the shielding 5 comprising the shield element 5a together with the additional shield element 5b to the width W may be in a range from 0.6 to 0.8 such as in a range of about 0.67 to 0.8, e.g., 0.67 to 0.78. Additionally or alternatively, a quotient of the width d to the width Wa may be in a range from about 0.3 to about 0.6 or in a range from about 0.34 to about 0.57 or in the range from about 0.32 to 0.55. Additionally or alternatively, the quotient of the width d to the width W may be in a range from about 0.1 to about 0.3, preferably in a range from about 0.16 to about 0.28.

In accordance with some illustrative embodiments, an amount of overlapping between the antenna 7 and the shield element 5a may depend on a thickness of the document 1. Additionally or alternatively, the width d of the shield element 5a may depend on the thickness of the document 1. Additionally or alternatively, a width of the shielding 5 may depend on the thickness of the document 1. For example, a width of the shield element 5a may be indirectly proportional to the thickness of the document 1. For example, the document 1 may have a different thickness, depending on the purpose of the document 1. In a first illustrative example, a first example of the document 1 may be manufactured having a first thickness and a second example of the document 1 may have a second thickness, smaller than the first thickness etc. In case of the first example of the document 1, an amount of overlapping of the antenna 7 and the shield element 5a may differ from an amount of overlapping of the antenna 7 and the shield element 5a in the second example of the document 1 and so on.

In an explicit example, a relation between a width of a shield element and a thickness of the document may be such that the width d in the document 1 having a thickness of about 3 mm may be in the range from about 25 mm to about 35 mm, preferably the width d may be about 30 mm, and the width d in the document 1 having a thickness of about 5 mm may be in the range from about 45 mm to about 55 mm, preferably the width d may be about 50 mm. Any deviating thickness values may result in the width d being obtained by linear interpolation. This does not pose any limitation to the present invention and another relation may be chosen instead.

In some illustrative examples herein, the document 1 may have a thickness of about 3 mm and a quotient of the width d of the shield element 5a to the width W may be greater than about 0.22 or greater than about 0.25 or equal to about 0.28 or 0.29, depending on the number of pages. For example, the quotient may be 0.28 or 0.29 in case of document 1 having a thickness of about 3 mm. Any other thickness value may be interpolated from the value at about 3 mm in a linear manner.

In some illustrative examples herein, the document 1 may have a thickness of about 5 mm and a quotient of the width d of the shield element 5*a* to the width W may be smaller than about 0.22 or smaller than about 0.20 or equal to about 0.16 or 0.17, depending on the number of pages. For example, the quotient may be 0.16 or 0.17 in case of document 1 having a thickness of about 5 mm. Any other thickness value may be interpolated from the value at about 5 mm in a linear manner.

Referring to FIGS. 1 and 2, document 1 may be formed by laminating the RFID inlay 3 and the shield element 5*a* and the support portion 11 together, wherein the shield element 5*a* is arranged in between the RFID inlay 3 and the support portion 11. In accordance with some illustrative examples, an overlapping of the shield element 5*a* and the antenna 7 may be such that a quotient of an area of overlapping between the shield element 5*a* and the antenna 7 to an area covered by the antenna 7 may be in a range from 0.2 to 0.7, preferably in a range from 0.23 to 0.65. Additionally or alternatively, an overlapping distance along a width direction relative to a width dimension of the antenna 7 may be such that a quotient is in the range from 0.2 to 0.7, preferably in a range from 0.23 to 0.65.

In accordance with some illustrative embodiments and referring to FIG. 1, document 1 may be a booklet. In this case, the support portion 11 may correspond to a booklet cover. In accordance with these illustrative embodiments, the expression "the booklet cover" in the remaining description of FIG. 1 below will be referred to as "the booklet cover 11" and the support portion 11 will be identified with the booklet cover of the booklet in these embodiments.

In accordance with some illustrative embodiments herein and referring to FIG. 1, document 1 representing the booklet 1 comprises a front cover part, a back cover part and a booklet cover hinge by means of which the front cover part and the back cover part are connected. In case that the booklet 1 is in an open condition, such a condition corresponds to the top view illustrated in FIG. 1. In the open condition, the front cover part, booklet cover hinge and back cover part would be arranged in a lateral sequence as shown in FIG. 1, wherein the book cover hinge corresponding to a location of the spacing 9 would be at a center portion of the booklet 1. In the open condition, the additional shield element 5*b* and first shield element 5*a* are laterally separated by the spacing 9. In a closed condition, the front cover part and the back cover part are located on top of each other in a stacked configuration.

In accordance with some illustrative embodiments and referring to FIGS. 1 and 2, document 1 may be a booklet, which may be in a closed configuration such that the additional shield element 5*b* is arranged on top of the antenna 7. In the closed configuration, the antenna 7 is enclosed by the shield element 5 or, in other words, the antenna 7 is located in between the shield element 5*b* and the shield element 5*a*. Accordingly, a complete shielding of the RFID inlay 3 may be obtained in the closed condition, while a directed shielding may be provided in the open condition shown in FIG. 1. In other words, a directed reading only in a limited solid angle region of the RFID inlay 3 may be possible in the open condition as shown in FIG. 1, due to the only partial overlapping of the antenna 7 by the shield element 5*a*.

Figure 3:
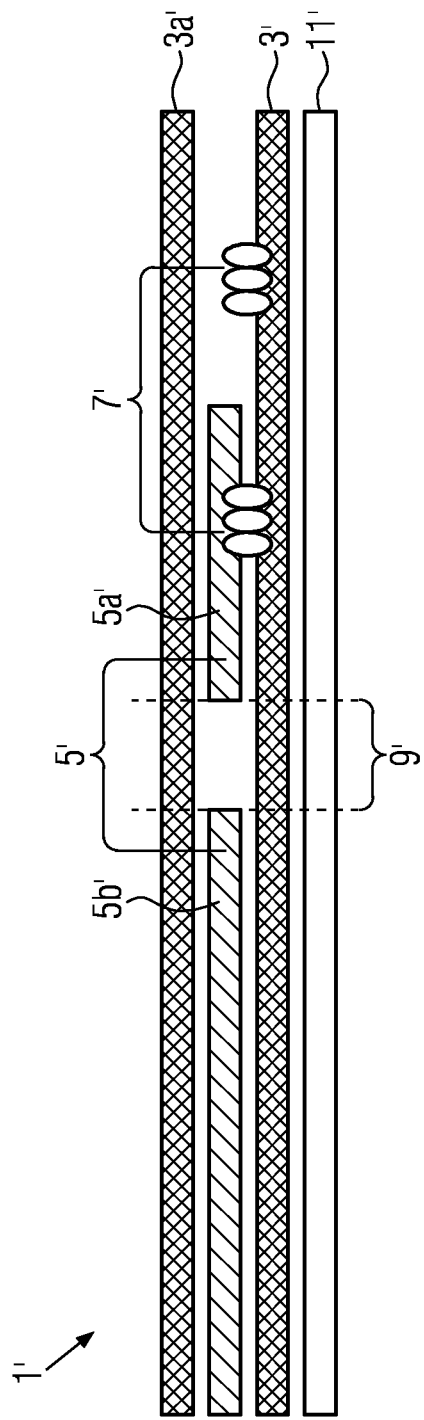
FIG. 3 schematically illustrates a cross-sectional view of a document in accordance with alternative embodiments.

Referring to FIG. 3, some alternative illustrative embodiments will be described below. These alternative illustrative embodiments differ from the embodiments described above with regard to FIGS. 1 and 2 in that the alternative illustrative embodiments have a second exemplary stacked configuration which represents an alternative to the first exemplary stacked configuration as described above with regard to FIGS. 1 and 2.

The illustration in FIG. 3 is to be understood as representing a cross-section of a document 1', which has the same top view as the top view illustrated in FIG. 1. Therefore, it is understood that a top view corresponding to document 1' in FIG. 3 accords to FIG. 1, where all the reference numerals in FIG. 1 receive an apostrophe. In this case, the description of FIG. 1, which only refers to FIG. 1 without explicitly referring to FIG. 2, applies to FIG. 3 in a direct manner, when replacing the reference numeral by according reference numerals having an apostrophe. In particular, reference numeral 1 becomes 1', reference numeral 3 becomes 3', reference numeral 5 becomes 5', reference numeral 5*a* becomes 5*a*', reference numeral 5*b* becomes 5*b*', reference numeral 7 becomes 7', reference numeral 9 becomes 9', reference numeral d becomes d', reference numeral Wa becomes Wa', and reference numeral W becomes W'. The above description of FIG. 1 is therefore incorporated by reference when replacing the reference numerals in FIG. 1 by reference numerals having an apostrophe in the above indicated manner.

In accordance with some alternative embodiments and referring to FIG. 3, the shield element 5*a*' may partially overlay the antenna 7'. For example, the shielding 5' may be arranged on the RFID inlay 3' such that the shielding 5' is partially overlying the antenna 7'. For example, the antenna 7' may be provided in and/or on an antenna portion of the RFID inlay 3' and the antenna portion of the RFID inlay 3 may be arranged in between the shielding 5' and the support portion 11'. An additional inlay layer 3*a*' may be provided on the shielding 5' such that the shielding 5' may be sandwiched between the additional inlay layers 3*a*' and the RFID inlay 3' comprising the antenna 7'. The additional inlay layer 3*a*' represents an upper inlay layer of the document 1', wherein the antenna 7' and the shielding 5' are sandwiched between the RFID inlay 3' and the additional inlay layer 3*a*'. The additional inlay layer 3*a*' may serve as a protection for the shielding 5' and the antenna 7' against mechanical impact, for example. Accordingly, damaging of the antenna 7' may be avoided.

In accordance with some special illustrative but not limiting embodiments, both of the antenna 7' and the shield element 5*a*' may be provided by metallic foils, thereby forming a smooth planar surface when stacking the shield element 5*a*' and the antenna 7' over the RFID inlay 3' without any creasing that may impair a proper function of the document 1' during use.

In accordance with some illustrative examples herein and as illustrated in FIG. 3, the shielding 5' comprises a shield element 5*a*'. Optionally, the shielding 5' may further include an additional shield element 5*b*' which is arranged on the RFID inlay 3'. The additional shield element 5*b*' may be spaced apart from the shield element 5*a*' by means of a spacing 9'.

In accordance with some illustrative embodiments, the additional layer 3*a*' may be formed above the shield element 5*a*' and the additional shield element 5*b*' such that both of the shield element 5*a*' and the additional shield element 5*b*' are covered by the additional inlay layer 3*a*'. Alternatively, the additional inlay layer 3*a*' may be formed above the shield element 5*a*' such that the shield element 5*a*' and the antenna 7' are covered by the additional inlay layer 3*a*', whereas the additional shield element 5*b*' is not covered by the additional inlay layer 3*a*'.

In the illustration of FIG. 3, the antenna 7' is arranged between the shield element 5a' and the RFID inlay 3'. This does not pose any limitation to the present disclosure and, alternatively, the shield element 5a' may be arranged between the antenna 7' and the RFID inlay 3'.

In the illustration of FIG. 3, the RFID inlay 3' is formed directly on the support portion 11'. This does not pose any limitation to the present disclosure and the antenna 7' or shielding 5 (the shield element 5a') may be arranged directly on the support portion 11', instead. For example, although not illustrated, the antenna 7' may be provided in and/or on an antenna portion of the RFID inlay 3' and the RFID inlay 3' may be arranged on the shielding 5' which is located directly on the support portion 11'.

Although FIGS. 1, 2, and 3 do not indicate additional pages of the booklet, one or more additional pages of the booklet may be provided. For example, one or more additional pages of the booklet 1 may be connected to the booklet at the booklet cover hinge given by the spacing 9.

Figure 4A:
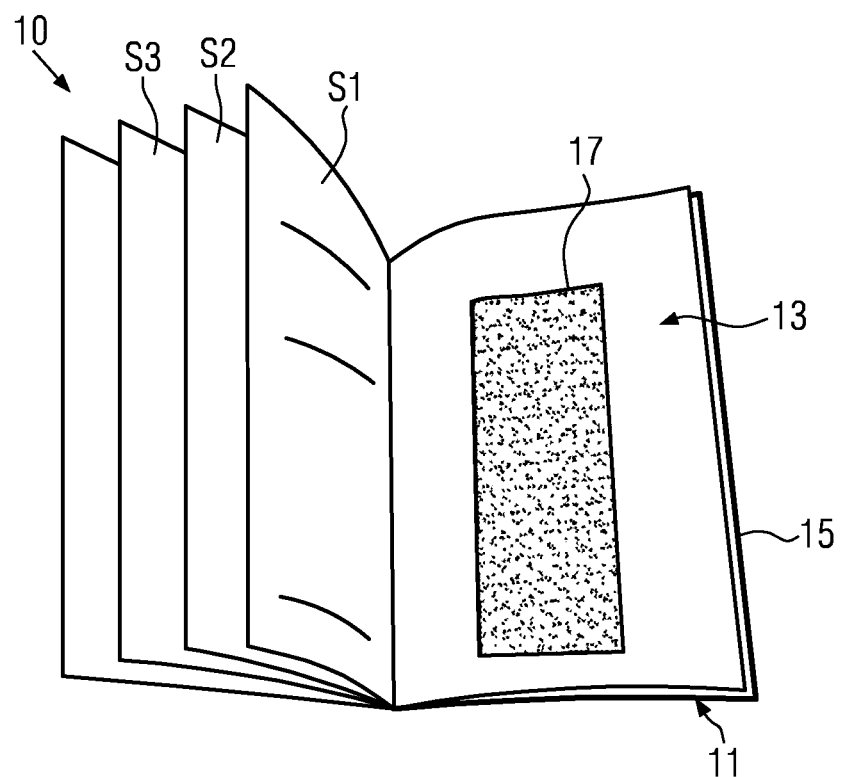
FIG. 4a schematically illustrates a perspective view of a document in accordance with other illustrative embodiments of the present invention.
Figure 4B:
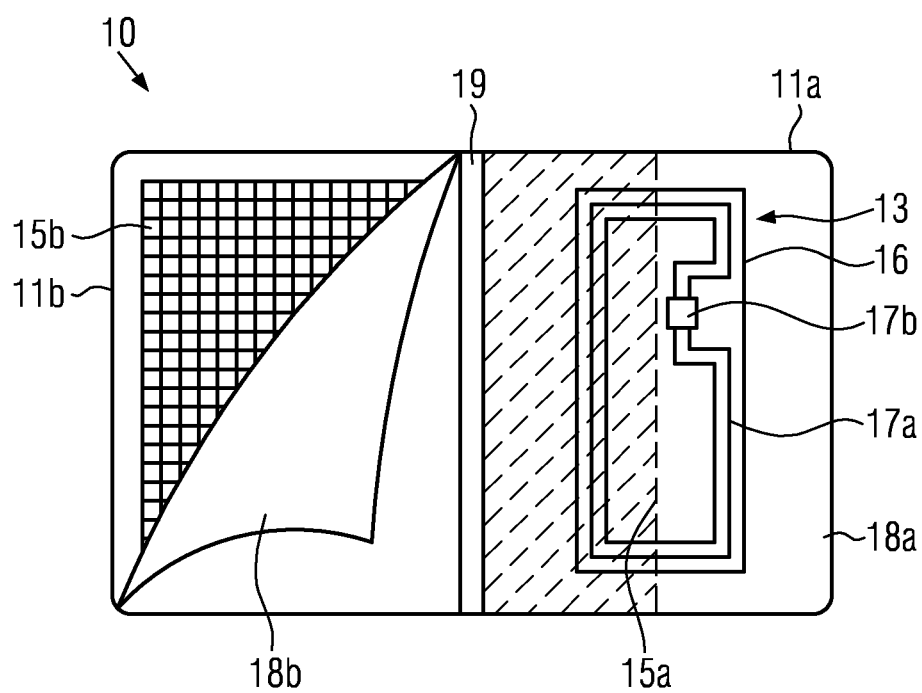

Referring to FIGS. 4a and 4b, a document 10 is shown, the document 10 comprising an RFID inlay 13, a shielding 15 and a support portion corresponding to the support portion 11 as described above with regard to FIG. 1 to 3, the entire disclosure of which is included here by reference. As illustrated in a broken line shading in FIG. 4b, the shielding 15 may comprise a shield element 15a which is arranged with respect to the RFID inlay 13 so as to only partially overlap with an antenna 17 of the RFID inlay 13. In accordance with some illustrative embodiments herein, the shield element 15a may be arranged between the support portion 11 and the RFID inlay 13. In accordance with some alternative embodiments, the RFID inlay 13 may be arranged on the support portion 11 and the shield element 15a may be arranged on the RFID inlay 13. For example, the RFID inlay 13 may be arranged in between the shield element 15a and the support portion 11. For example, the shield element 15a may be one of a metallic foil and a metal plate and a metal grid. For example, a metallic foil may have a continuous metal layer or a grid patterned metal layer for implementing the shield element 15a. A metal grid may be formed to have a line width in the range from about 100 μm to about 500 μm, preferably in the range from about 100 μm to about 300 μm, more preferably in the range from about 150 μm to about 250 μm, such as at about 200 μm.

In accordance with some illustrative examples herein, the shielding 15 may have a thickness of at most 100 μm. For example, the thickness of the shielding 15 may be in the range from about 1 μm to about 100 μm. The person skilled in the art will appreciate that the upper limit of 100 μm for the thickness of the shielding 15 may not be considered as limiting the invention to this thickness. However, in addition to aesthetic reasons according to which it may be desirable to reduce an amount of possible stepping in the document's surface due to the presence of the shielding 15, it is cost efficient and allows to saves resources when optimizing the thickness of the shielding 15 to an thickness range in which a required minimum shielding performance is realized, while reducing the amount of materials employed in the preparation and attachment of the shielding 15 over the support portion 11. For example, aside from reducing the amount of material used for preparing the shielding 15, an amount of adhesive means used for attaching the shielding 15 over the support portion 11 may be reduced, as well. Furthermore, a risk of unintentional damage of the document 1 due to a stepping of more than 100 μm caused by the shielding 15 formed over the support portion 11 may be reduced. Regarding a lower limit of the thickness of the shielding 15, the inventors observed that a shielding performance of a shielding having a thickness of less than 1 μm may not be sufficiently high to ensure a required shielding performance.

In accordance with some illustrative embodiments and with continued reference to FIG. 4b, the shielding 15 may further comprise an additional shield element 15b which may be provided on the support portion 11, wherein the additional shield element 15b is arranged over the support portion 11 with a spacing 19 relative to the shield element 15a. For example, the additional shield element 15b may be arranged directly on the support portion 11 or it may be arranged on the RFID inlay 13. The spacing 19 may be located at the center portion of the document 10 and, in accordance with some illustrative but non-limiting examples herein, may comprise a hinge portion or fold. In case that the spacing 19 comprises a hinge portion or fold, the document 10 may be folded at the spacing 19 such that the part of the support portion 11 supporting the shield element 15a and the remaining part of the support portion 11 on the other side of the spacing 19 may be folded on top of each other. It is noted that the additional shield element 15b is not construed as limiting to the invention and the additional shield element 15b may be omitted instead, in which case the shielding is only realized by the shield element 15a. Furthermore, the spacing 19 may or may not comprise a hinge portion or fold, independent of the presence of the additional shield element 15b. The additional shield element 15b may be one of a metallic foil and a metal plate and a metal grid. For example, a metallic foil may have a continuous metal layer or a grid patterned metal layer for implementing the additional shield element 15b.

In accordance with some special illustrative embodiments, the shielding 15 may be one of a metallic foil, such as a foil made of aluminum, copper and the like, attached to the support portion 11 and a metallic ink printed onto the support portion 11, such as a silver ink or paste. For example, the metallic foil may be attached by means of a heat-activated glue or a cold glue or by means of hot or cold roll lamination techniques. In accordance with some preferred but not limiting examples herein, an aluminum foil may be used for providing the shielding 15, the aluminum foil representing a cost efficient material when compared to other materials employed as conductive coatings used for EM and RF shielding, such as copper and silver.

In accordance with some special advantageous, but not limiting embodiments of the present disclosure, a metallic foil may be provided by forming a thin layer of metal on a carrier material, such as a PET material. For example, as a metal material for the thin layer of metal, aluminum, copper, silver and the like may be used. Furthermore, the accordingly provided metallic foil may have an optional adhesive layer bonded thereon such that the metallic foil together with the adhesive layer may be attached on the support portion 11 by means of the adhesive layer and, optionally, the carrier material may be removed after attachment of the metallic foil on the support portion 11, thereby leaving the thin layer of metal on the support portion 11 attached thereto with the adhesive layer. In case that the carrier layer is not removed, the carrier layer may provide an improved bonding strength to subsequently formed layers on the shielding 15.

In accordance with some special illustrative examples, the support portion 11 may be provided by a synthetic fiber paper material as described above. In this case, it is possible to attach a thin metallic foil on the support portion 11 in a comparatively smooth manner when compared to a case in which the support material 11 comprises traditional paper material where a thin metallic foil attached to the support material 11 is creased, thereby impairing bonding of subsequent layers on the shielding 15.

In accordance with some illustrative embodiments herein, the additional shield element 15b may be arranged on top of the antenna 17 such that the antenna 17 is sandwiched between the shield element 15a and the additional shield element 15b in case that the spacing 19 comprises a hinge portion or fold.

In some special illustrative but not limiting embodiments, the antenna 17 may be provided by means of a metallic foil which is prepared as described above with regard to the shielding 15. For example, a metallic foil as described above may be subjected to an etching process such that the thin layer of metal on the carrier material of the metallic foil may be etched such that an etched metal material left on the carrier material after etching realizes an antenna pattern providing the antenna 17 when attaching the metallic foil on the RFID inlay 13.

In accordance with some special illustrative but not limiting embodiments, both of the antenna 17 and the shield element 15a may be provided by metallic foils, thereby forming a smooth planar surface when stacking the shield element 15a and the antenna 17 over the RFID inlay 13 without any creasing that may impair a proper function of the document 10 during use.

In accordance with some illustrative examples, the antenna 17 may have a thickness of at most 100 µm. For example, the thickness of the antenna 17 may be in the range from about 1 µm to about 100 µm. The person skilled in the art will appreciate that the upper limit of 100 µm for the thickness of the antenna 17 may not be considered as limiting the invention to this thickness. However, in addition to aesthetic reasons according to which it may be desirable to reduce an amount of possible stepping in the document's surface due to the presence of the antenna 17, it is cost efficient and allows to saves resources when optimizing the thickness of the antenna 17 to an thickness range in which a required minimum performance of the antenna is realized, while reducing the amount of materials employed in the preparation and attachment of the antenna 17 over the support portion 11. For example, aside from reducing the amount of material used for preparing the antenna 17, an amount of adhesive means used for attaching the antenna 17 over the support portion 11 may be reduced, as well. Furthermore, a risk of unintentional damage of the document 1 due to a stepping of more than 100 µm caused by the antenna 17 formed over the support portion 11 may be reduced. Regarding a lower limit of the thickness of the antenna 17, the inventors observed that a performance of an antenna having a thickness of less than 1 µm may not be sufficiently high to ensure a required performance of the antenna 17.

The document 10 of FIGS. 4a and 4b represents a booklet having the support portion 11 which, in the presently described embodiments below, becomes a booklet cover comprising a front cover part 11a, a back cover part 11b and a booklet cover hinge 19 connecting the front cover part 11a and the back cover part 11b. This does not impose any limitation and the back cover part may be given the part of the support portion 11 indicated by reference numeral 11a instead, whereas the front cover part may be given the part of the support portion 11 indicated by reference numeral 11b. In some illustrative examples herein, the booklet cover may comprise at least one of a piece of paper and a piece of cardboard and a piece of paperboard and a piece of millboard and a piece of pasteboard and a piece of corrugated fiberboard and a board of polycarbonate material etc.

In accordance with some illustrative embodiments, the booklet 10 further comprises a number of pages, which are schematically illustrated in FIG. 4a by means of pages S1, S2 and S3. The number of pages may be smaller than 32 pages, such as 1 page or more than one pages such as 17 or 28 pages, or may be greater than 32 pages, such as 43 pages or 52 pages. This does not pose any limitation to the present disclosure and an arbitrary number of pages may be provided in the booklet 10. The antenna 17 of the RFID inlay 13 may be provided on the front cover part 11a, although this does not pose any limitation to the present disclosure and the antenna 17 of the RFID inlay 13 may be provided on the back cover part 11b, instead. In accordance with some illustrative examples herein, one of the pages may be formed by a sheet of polycarbonate material.

Referring to FIG. 4b, a top view of the booklet cover is schematically shown. In accordance with some illustrative examples herein, the antenna 17 may be provided as an inductive antenna and it may comprise an inductive coil 17a and a chip 17b, provided on a substrate 16. The RFID inlay 3 may further include a memory device (not illustrated) which may save personal data of the holder of the booklet 10, such as identity data of the holder, bank data of the holder, and security data of the holder. The memory device (not illustrated) may be only readable or may be readable and writable with new information input by the holder of the booklet 10.

Referring to FIGS. 4a and 4b, each of a quotient of a width of the shield element 15a to a width of the front cover part 11a and a quotient of the width of the shield element 15a to the width of the entire support portion 11 and a quotient of a width of the shielding 15 to a width of the entire support portion 11 may be in the range from about 0.1 to about 0.8. For example, a quotient of a width of the shielding 15 comprising the shield element 15a together with the additional shield element 15b to the width of the entire support portion 11 may be in a range from 0.6 to 0.8 such as in a range of about 0.67 to 0.8, e.g., 0.67 to 0.78. Additionally or alternatively, a quotient of the width of the shield element 15a to the width of the front cover part 11a may be in a range from about 0.3 to about 0.6 or in a range from about 0.34 to about 0.57 or in the range from about 0.32 to 0.55. Additionally or alternatively, the quotient of the width of the shield element 15a to the width of the entire support portion 11 may be in a range from about 0.1 to about 0.3, preferably in a range from about 0.16 to about 0.28.

In accordance with some illustrative embodiments, an amount of overlapping of the antenna 17 and the shield element 15a may depend on a thickness of the document 10. Additionally or alternatively, the width of the shield element 15a may depend on the thickness of the document 10. Additionally or alternatively, the width of the shielding 15 may depend on the thickness of the document 10. For example, a width of the shielding 15 (and thus of the shield element 15a) may be indirectly proportional to the thickness of the document 10.

In an explicit example, a relation between width and thickness may be such that the width of the shield element 15a in the document 10 having a thickness of about 3 mm, may be in the range from about 25 mm to about 35 mm, preferably the width of the shield element 15a may be about 30 mm, and the width of the shield element 15a in the document 10 having a thickness of about 5 mm, may be in the range from about 45 mm to about 55 mm, preferably the width of the shield element 15a may be about 50 mm. Any deviating thickness values may result in the width of the shield element 15a being obtained by linear interpolation. This does not pose any limitation to the present invention and another relation may be chosen instead.

In some illustrative examples herein, the document 10 may have a thickness of about 3 mm and a quotient of the width of the shield element 15a to the width of the booklet cover 11 may be greater than about 0.22 or greater than about 0.25 or equal to about 0.28 or 0.29, depending on the number of pages. For example, the quotient may be 0.28 or 0.29 in case of document 10 having a thickness of about 3 mm. Any other thickness value may be interpolated from the value at about 3 mm in a linear manner.

In some illustrative examples herein, the document 10 may have a thickness of about 5 mm and a quotient of the width of the shield element 15a to the width of the booklet cover 11 may be smaller than about 0.22 or smaller than about 0.20 or equal to about 0.16 or 0.17, depending on the number of pages. For example, the quotient may be 0.16 or 0.17 in case of document 10 having a thickness of about 5 mm. Any other thickness value may be interpolated from the value at about 5 mm in a linear manner.

Referring to FIGS. 4a and 4b, document 10 may be formed by laminating the RFID inlay 13 and the shield element 15a and the support portion 11 together, wherein the shield element 15a is arranged in between the RFID inlay 13 and the support portion 11. In accordance with some illustrative examples, an overlapping of the shield element 15a and the antenna 17 may be such that a quotient of an area of overlapping between the shield element 15a and the antenna 17 to an area covered by the antenna 17 may be in a range from 0.2 to 0.7, preferably in a range from 0.23 to 0.65. Additionally or alternatively, an overlapping distance along a width direction relative to a width dimension of the antenna 17 may be such that a quotient is in the range from 0.2 to 0.7, preferably in a range from 0.23 to 0.65.

In accordance with some illustrative embodiments, the antenna 17 may be arranged on an additional paper material 18a covering the shield element 15a which is therefore sandwiched between the paper material 18a and the front cover part 11a. Alternatively, the RFID inlay 13 may be directly arranged on the shield element 15a such that the shield element 15a is directly sandwiched between the RFID inlay 13 and the front cover part 11a. In the latter case, the paper material 18a may be provided on top of the RFID inlay 13 for covering the RFID inlay 13 and the shield element 15a inside the booklet 10.

In accordance with some illustrative embodiments, an (optional) additional shield element 15b may be provided on the back cover part 11b of the booklet cover 11. The additional shield element 15b may be formed covered by a paper material 18b. As schematically shown in FIG. 4b, the paper material 18b may have a size corresponding to a size of each of the pages S1 to S3. For example, the size of the paper material 18 may be greater than the size of the additional shield element 15b such that the additional shield element 15b may be completely covered by the paper material 18b and the back cover part 11b. In accordance with some illustrative examples herein, the paper material 18b and 18a may be permanently attached to the booklet cover 11, e.g., by pasting, gluing, lamination and the like.

Figure 5:
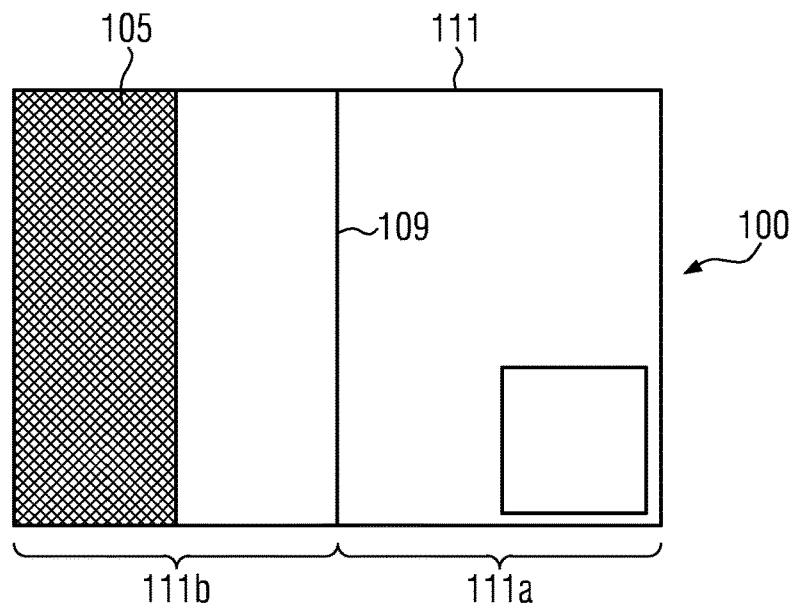
FIG. 5 schematically illustrates a top view of a document in accordance with further illustrative embodiments of the present invention.

Referring to FIG. 5, a document 100 is shown, the document 100 comprising a shielding 105 and a support portion 111. In accordance with some illustrative embodiments herein, the support portion 111 may comprise at least one of a piece of paper and a piece of cardboard and a piece of paperboard and a piece of millboard and a piece of pasteboard and a piece of corrugated fiberboard and a board of polycarbonate material and a paper-based material and a synthetic fiber paper and the like. For example, synthetic fiber paper may be understood as representing a non-cellulosic sheet material resembling paper and used in a similar fashion, typically made from thermoplastic materials such as polyolefins, nylon, polystyrene, etc., by direct film or foil extrusion or by bonding filaments thereof. Additionally or alternatively, synthetic fiber paper is understood as representing a category of paper that is made without any wood fibers and is especially formulated to be receptive to commercial printing inks. In any way, synthetic fiber paper differs from a plastic film with respect to printing characteristics and it differs from traditional paper due to the lack of wood fibers. In other words, synthetic fiber paper is considered as being a paper-like film that lies somewhere between traditional plastic films and high-value paper. As opposed to traditional paper, synthetic fiber papers use a plastic resin backbone rather than the pulped wood fibers used in traditional paper. However, synthetic fiber papers and traditional papers both use mineral fillers and optical brighteners to gain opacity, brightness and smoothness. Therefore, printability characteristics for synthetic fiber papers and traditional papers formed of a wood pulp are comparably developed by the use of calendering rolls and imparting surface printability enhancements.

In accordance with some illustrative examples, the shielding 105 may have a thickness of at most 100 μm. For example, the thickness of the shielding 105 may be in the range from about 1 μm to about 100 μm. The person skilled in the art will appreciate that the upper limit of 100 μm for the thickness of the shielding 105 may not be considered as limiting the invention to this thickness. However, in addition to aesthetic reasons according to which it may be desirable to reduce an amount of possible stepping in the document's surface due to the presence of the shielding 105, it is cost efficient and allows to saves resources when optimizing the thickness of the shielding 105 to an thickness range in which a required minimum shielding performance is realized, while reducing the amount of materials employed in the preparation and attachment of the shielding 105 over the support portion 111. For example, aside from reducing the amount of material used for preparing the shielding 105, an amount of adhesive means used for attaching the shielding 105 over the support portion 111 may be reduced, as well. Furthermore, a risk of unintentional damage of the document 1 due to a stepping of more than 100 μm caused by the shielding 105 formed over the support portion 111 may be reduced. Regarding a lower limit of the thickness of the shielding 105, the inventors observed that a shielding performance of a shielding having a thickness of less than 1 μm may not be sufficiently high to ensure a required shielding performance.

In accordance with some illustrative but not limiting embodiments of the present disclosure, the document 100 may be provided in form of a booklet, for example, by folding the support portion 111 into two parts, a front cover part 11a and a back cover part 11b connected along a fold or hinge 109. The fold or hinge 109 may be a portion at which a plurality of pages may be attached.

FIG. 5 may represent an early stage during fabrication of the document 100, wherein the support portion 111 is provided, possibly with text portions as indicated by a box in FIG. 5, and having the shielding 105 formed on the support portion 111. At the stage illustrated in FIG. 5, an RFID inlay (not illustrated) and an antenna (not illustrated) may not yet be attached to the document 100, but may be provided during subsequent fabrication. However, this does not pose any limitation to the present invention and, alternatively, an RFID inlay (not illustrated) and an antenna (not illustrated) may be already provided on the support portion 111 prior to the stage illustrated in FIG. 5. In some special illustrative but not limiting embodiments, the antenna (not illustrated) may be provided by means of a metallic foil which is prepared as described above with regard to the shielding 105. For example, a metallic foil as described above may be subjected to an etching process such that the thin layer of metal on the carrier material of the metallic foil may be etched such that an etched metal material left on the carrier material after etching realizes an antenna pattern providing the antenna (not illustrated) when attaching the metallic foil on the RFID inlay (not illustrated).

In accordance with FIG. 5, the shielding 105 is dispensed in the form of a strip, the strip being laid down over the support portion 100.

In case that an RFID inlay (not shown) is to be provided at a later stage during processing, a final attachment of the shielding 105 may take place after an RFID inlay (not illustrated) is arranged over the support portion 111 and the shielding 105 in the manner that an antenna (not illustrated) of the RFID inlay (not illustrated) is only partially overlapping the shielding 105.

Alternatively, an RFID inlay (not shown) may be present on the support portion 111 and the shielding 105 may be laid down over the support portion 100 such that the shielding 105 is only partially overlapping an antenna (not illustrated) of the RFID inlay (not illustrated).

With continued reference to FIG. 5, the shielding 105 may be one of a metallic foil and a metal plate and a metal grid. For example, a metallic foil may have a continuous metal layer or a grid patterned metal layer for implementing the shielding 105. A metal grid may be formed to have a line width in the range from about 100 μm to about 500 μm, preferably in the range from about 100 μm to about 300 μm, more preferably in the range from about 150 μm to about 250 μm, such as at about 200 μm.

In accordance with some special illustrative embodiments, the shielding 105 may be one of a metallic foil, such as a foil made of aluminum, copper and the like, attached to the support portion 111 and a metallic ink printed onto the support portion 111, such as a silver ink or paste. For example, the metallic foil may be attached by means of a heat-activated glue or a cold glue or by means of hot or cold roll lamination techniques. In accordance with some preferred but not limiting examples herein, an aluminum foil may be used for providing the shielding 105, the aluminum foil representing a cost efficient material when compared to other materials employed as conductive coatings used for EM and RF shielding, such as copper and silver.

In accordance with some special advantageous, but not limiting embodiments of the present disclosure, a metallic foil may be provided by forming a thin layer of metal on a carrier material, such as a PET material. For example, as a metal material for the thin layer of metal, aluminum, copper, silver and the like may be used. Furthermore, the accordingly provided metallic foil may have an optional adhesive layer bonded thereon such that the metallic foil together with the adhesive layer may be attached on the support portion 111 by means of the adhesive layer and, optionally, the carrier material may be removed after attachment of the metallic foil on the support portion 111, thereby leaving the thin layer of metal on the support portion 111 attached thereto with the adhesive layer. In case that the carrier layer is not removed, the carrier layer may provide an improved bonding strength to subsequently formed layers on the shielding 105.

In accordance with some special illustrative examples, the support portion 111 may be provided by a synthetic fiber paper material as described above. In this case, it is possible to attach a thin metallic foil on the support portion 111 in a comparatively smooth manner when compared to a case in which the support material 111 comprises traditional paper material where a thin metallic foil attached to the support material 111 is creased, thereby impairing bonding of subsequent layers on the shielding 105.

Figure 6:
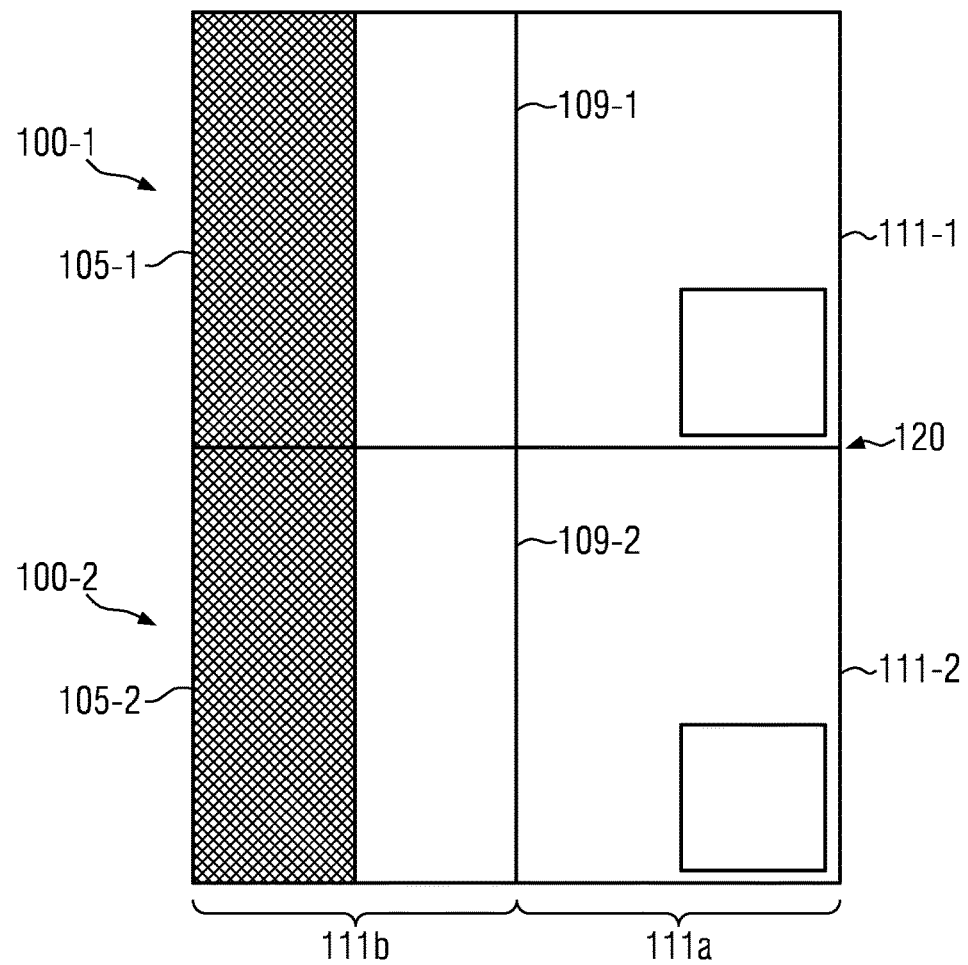
FIG. 6 schematically illustrates a stage in the manufacture of the document of FIG. 5.

Referring to FIG. 6, a block diagram illustrating the manufacture of a plurality of documents 100-1 and 100-2 is shown, each of the documents 100-1 and 100-2 being provided similar to the document 100 shown in FIG. 5. Particularly, document 100-1 has a support portion 111-1 and a shielding 105-1, and document 100-2 has a support portion 111-2 and a shielding 105-2.

In accordance with illustrative embodiments, each of the documents 100-1 and 100-2 has a fold line 109-1, 109-2 similar to the fold 109 in FIG. 5. Therefore, the documents 100-1 and 100-2 each have front and back cover parts 111a and 111b similar to FIG. 5.

At the stage illustrated in FIG. 6, the documents 100-1 and 100-2 are provided as strip elements, as well as each of the shielding 105-1 and 105-2 being provided as a single strip which is laid down over what will later become several separate documents 100-1 and 100-2 when the manufacturing is completed. After the assembling is completed, the assembled material including the shield element strip is cut along a cutting line 120 to separate the documents 100-1 and 100-2. As a result, a plurality of identical documents 100-1 and 100-2 may be produced in parallel. The cutting along the cutting line 120 may take place after each of the shieldings 105-1 and 105-2 is laid down by means of a single strip. Optionally, pages may be attached to the assembled material prior to the cutting.

In accordance with some illustrative embodiments and as described with regard to FIG. 5 above, an RFID inlay (not illustrated) may be assembled to the documents 100-1 and 100-2 prior of after assembling the shield element strip to the documents 100-1 and 100-2.

In accordance with some illustrative embodiments, an amount of overlapping of an antenna (not illustrated in FIGS. 5 and 6) and the shielding 105 may depend on a thickness of each document 100. Additionally or alternatively, the width of the shielding 105 element may depend on the thickness of the document 100. For example, a width of the shielding 105 may be indirectly proportional to the thickness of each document 100. In an explicit example, a relation between width and thickness may be such that the width of the shielding 105 in each document 100 having a thickness of about 3 mm, may be in the range from about 25 mm to about 35 mm, preferably the width of the shielding 105 may be about 30 mm, and the width of the shielding 105 in the document 100 having a thickness of about 5 mm, may be in the range from about 45 mm to about 55 mm, preferably the width of the shielding 105 may be about 50 mm. Any deviating thickness values may result in the width of the shielding 105 being obtained by linear interpolation. This does not pose any limitation to the present invention and another relation may be chosen instead.

In some illustrative examples herein, each document 100 may have a thickness of about 3 mm and a quotient of the width of the shielding 105 to the width of the support portion 111 may be greater than about 0.22 or greater than about 0.25 or equal to about 0.28 or 0.29, depending on the number of pages. For example, the quotient may be 0.28 or 0.29 in case of each document 100 having a thickness of about 3 mm. Any other thickness value may be interpolated from the value at about 3 mm in a linear manner.

In some illustrative examples herein, each document 100 may have a thickness of about 5 mm and a quotient of the width of the shielding 105 to the width of the support portion 111 may be smaller than about 0.22 or smaller than about 0.20 or equal to about 0.16 or 0.17, depending on the number of pages. For example, the quotient may be 0.16 or 0.17 in case of each document 100 having a thickness of about 5 mm. Any other thickness value may be interpolated from the value at about 5 mm in a linear manner.

Referring to FIGS. 5 and 6, each of a quotient of a width of the shielding 105 to a width of the cover part 111b and a quotient of the width of the shielding 105 to the width the support portion 111 may be in the range from about 0.1 to about 0.8. For example, a quotient of the width of the shielding 105 to the width of the support portion 111b may be in a range from about 0.3 to about 0.6 or in a range from about 0.34 to about 0.57 or in the range from about 0.32 to 0.55. Additionally or alternatively, the quotient of the width of the shielding 105 to the width of the support portion 111 may be in a range from about 0.1 to about 0.3, preferably in a range from about 0.16 to about 0.28.

In accordance with some illustrative embodiments, the width of the shielding 105 may depend on the thickness of the document 100. For example, a width of the shielding 105 may be indirectly proportional to the thickness of the document 100. In an explicit example, a relation between width and thickness may be such that the width of the shielding 105 in the document 100 having a thickness of about 3 mm, may be in the range from about 25 mm to about 35 mm, preferably the width of the shielding 105 may be about 30 mm, and the width of the shielding 105 in the document 100 having a thickness of about 5 mm, may be in the range from about 45 mm to about 55 mm, preferably the width of the shielding 105 may be about 50 mm. Any deviating thickness values may result in the width of the shielding 105 being obtained by linear interpolation. This does not pose any limitation to the present invention and another relation may be chosen instead.

Referring to FIGS. 5 and 6, document 100 may be formed by subsequently laminating an RFID inlay (not illustrated) onto the shielding 105 in some illustrative embodiments, wherein the shielding 105 is arranged in between the RFID inlay (not illustrated) and the cover portion 111. Alternatively, the document 100 may be formed by subsequently laminating the shielding 105 onto an RFID inlay (not illustrated) having an antenna (not illustrated).

In accordance with some illustrative examples herein, an overlapping of the shielding 105 and an antenna (not illustrated) of the RFID inlay (not illustrated) may be such that a quotient of an area of overlapping between the shielding 105 and the antenna (not illustrated) to an area covered by the antenna (not illustrated) may be in a range from 0.2 to 0.7, preferably in a range from 0.23 to 0.65. Additionally or alternatively, an overlapping distance along a width direction relative to a width dimension of the antenna (not illustrated) may be such that a quotient is in the range from 0.2 to 0.7, preferably in a range from 0.23 to 0.65.

With continued reference to FIG. 6, each of the shielding 105-1 and 105-2 may be one of a metallic foil and a metal plate and a metal grid and a metallic ink. For example, a metallic foil may have a continuous metal layer or a grid patterned metal layer for implementing each of the shielding 105-1 and 105-2. A metal grid may be formed to have a line width in the range from about 100 μm to about 500 μm, preferably in the range from about 100 μm to about 300 μm, more preferably in the range from about 150 μm to about 250 μm, such as at about 200 μm.

In accordance with some special illustrative embodiments, each of the shielding 105-1 and 105-2 may be one of a metallic foil, such as a foil made of aluminum, copper and the like, attached to the support portion 111 and a metallic ink printed onto the support portion 111, such as a silver ink or paste. For example, the metallic foil may be attached by means of a heat-activated glue or a cold glue or by means of hot or cold roll lamination techniques. In accordance with some preferred but not limiting examples herein, an aluminum foil may be used for providing the shielding 105, the aluminum foil representing a cost efficient material when compared to other materials employed as conductive coatings used for EM and RF shielding, such as copper and silver.

In accordance with some special advantageous, but not limiting embodiments of the present disclosure, a metallic foil may be provided by forming a thin layer of metal on a carrier material, such as a PET material. For example, as a metal material for the thin layer of metal, aluminum, copper, silver and the like may be used. Furthermore, the accordingly provided metallic foil may have an optional adhesive layer bonded thereon such that the metallic foil together with the adhesive layer may be attached on the support portion 111 by means of the adhesive layer and, optionally, the carrier material may be removed after attachment of the metallic foil on the support portion 111, thereby leaving the thin layer of metal on the support portion 111 attached thereto with the adhesive layer. In case that the carrier layer is not removed, the carrier layer may provide an improved bonding strength to subsequently formed layers on each of the shielding 105-1 and 105-2.

In accordance with some special illustrative examples, the support portion 111 may be provided by a synthetic fiber paper material as described above. In this case, it is possible to attach a thin metallic foil on the support portion 111 in a comparatively smooth manner when compared to a case in which the support material 111 comprises traditional paper material where a thin metallic foil attached to the support material 111 is creased, thereby impairing bonding of subsequent layers on each of the shielding 105-1 and 105-2.

Referring to FIG. 5, the shielding 105 may be provided by means of a single shield element corresponding to the shield elements 5a, 5a', and 15a described above with regard to FIG. 1 to 4. This does not pose any limitation to the present disclosure and the person skilled in the art will appreciate that an additional shield element (not illustrated) may be provided over the cover part 111a. For example, the additional shield element (not illustrated) may be provided in accordance with the additional shield elements 5b, 5b', and 15b as described above with regard to FIG. 1 to 4.

Referring to FIG. 6, each of the shielding 105-1 and 105-2 may be provided by means of a single shield element corresponding to the shield elements 5a, 5a', 15a, and 105 as described above with regard to FIG. 1 to 5. This does not pose any limitation to the present disclosure and the person skilled in the art will appreciate that additional shield elements (not illustrated) may be provided over the cover part 111a. For example, the additional shield elements (not illustrated) may be provided in accordance with the additional shield elements 5b, 5b', and 15b as described above with regard to FIG. 1 to 4.

In accordance with some illustrative embodiments, the shield element as described above with regard to various embodiments connection with FIG. 1 to 6, may be provided in form of a metal material, such as a metal foil, metal grid or the like. As an explicit example of metal material, AB13AL may be used, although this does not pose any limitation to the present disclosure and any other metal foil or metal grid may be used instead, such as a foil or grid formed of Cu or Al and the like.

Although the above embodiments are described with regard to an inductive antenna, this does not pose any limitation to the present disclosure. As an alternative to an inductive antenna, a capacitive antenna may be used instead. For example, a conductive antenna may be obtained by replacing a coil by a capacitor.

In accordance with some illustrative embodiments, a document, e.g., an identity document, having an RFID inlay may be provided with a shielding. For example, a biometric passport having a shielding may be provided or a notebook having an RFID inlay and a shielding may be provided, the RFID inlay comprising a memory device in which personal information of the holder of the notebook is saved, such as personal data of the holder.

In accordance with some illustrative embodiments as described above, an aluminum foil as an example of a metallic foil may be arranged directly on the support portion or on an RFID inlay provided on the support portion. In some illustrative examples herein, another aluminum foil may be formed directly on the aluminum foil, particularly on a carrier material of the aluminum foil (that is a carrier material on which a thin layer of aluminum is located), thereby improving an bonding strength of the other aluminum foil on the carrier material of the lower aluminum foil. A carrier material of the other aluminum foil may be optionally removed. Alternatively, an RFID inlay may be formed prior to forming the other aluminum foil such that the RFID inlay is sandwiched between two aluminum foils. In the first case of two aluminum foils being directly arranged on top of each other, the other aluminum foil may be a shield element of a shielding. In the second case of an RFID inlay being sandwiched between two aluminum foils, the aluminum foil on the RFID inlay may be a patterned foil to implement an antenna pattern.

In accordance with some illustrative embodiments as described above with regard to FIG. 1 to 6, at least one of a shielding or shield element and an antenna may be provided by a metallic foil or by printing a metallic ink onto an underlying surface. For example, a metallic foil or printed metallic ink may have a thickness of at most 100 µm, such as the thickness may be in the range from about 1 µm to about 100 µm. In some illustrative examples herein, a metallic foil may have a thickness in the range from about 5 µm to about 50 µm, preferably in the range from about 5 µm to about 40 µm, more preferably in the range from about 5 µm to about 40 µm. As some further examples, an exemplary thickness may be given by about 10 µm, about 15 µm, about 30 µm, about 40 µm, about 50 µm, about 60 µm, about 70 µm, about 80 µm, about 90 µm and a thickness value in an interval given by any two of these explicit values. With regard to a printed metallic ink, the printed metallic ink may have a thickness in the range from about 5 µm to about 50 µm, preferably in the range from about 5 µm to about 40 µm, more preferably in the range from about 5 µm to about 40 µm. As some further examples, an exemplary thickness may be given by about 10 µm, about 15 µm, about 30 µm, about 40 µm, about 50 µm, about 60 µm, about 70 µm, about 80 µm, about 90 µm and a thickness value in an interval given by any two of these explicit values.

Generally, the size of a passport document is defined in the standard ISO/IEC781OID-3, i.e., a passport document may have a size in the range from about 125 mm×88 mm to 125 mm×91 mm (height times width). Applying this standard to the embodiments as described above, the width Wa in FIG. 1 may be in the range from about 88 mm to 91 mm. Furthermore, a thickness of a passport document may be in the range from about 3 mm to about 5 mm, depending on the number of pages, when following this standard. For example, a passport having 32 pages may have a thickness of 3 mm and a passport having 48 pages may have a thickness of 5 mm. The covering of a passport booklet may be flexible or stable. In case of a stable covering, the covering may project outward with respect to pages inside the booklet in the size of 2 mm. Accordingly, the explicitly provided numbers may deviate by an amount of about 5 to 10% when making the difference between a flexible covering and a solid covering.

The present invention provides in various aspects a document with a shielding feature for enhancing product security of the document. The shielding material provided in the various aspects is able to reduce, shift or deform the power of signal that is sent from an antenna in the document to a reader. This is a concept of shielding with a directivity characteristic. The shielding material may be a metal material and an appropriate assembly for an efficient performance is disclosed in the various embodiments described above. In the various aspects described above, the shielding is provided in form of a self-assembled shielding due to the sandwich structure of the RFID inlay, shield element and support portion as described above. Accordingly, a more convenient usage at enhanced security is provided.

The inventors realized that a document as described with regard to the illustrative embodiments above, can increase the shielding performance the document because it becomes possible to increase or decrease the shield performance by expanding or reducing the area of shielding material depend on a thickness of the document.

The invention claimed is:

1. A document, comprising:
   an RFID inlay;
   a shield element; and
   a support portion,
   wherein the shield element, the support portion, and the RFID inlay are provided in a stacked configuration, the shielding element being attached over the support portion, and
   wherein a portion of the shield element and a part of an antenna of the RFID inlay are only partially overlapping each other, the antenna being over the support portion.

2. The document of claim 1, wherein the shield element partially overlays the antenna.

3. The document of claim 1, wherein the antenna is provided in and/or on an antenna portion of the RFID inlay, and wherein the antenna portion of the RFID inlay is arranged directly on the support portion.

4. The document of claim 1, wherein the shield element is arranged in between the support portion and the RFID inlay.

5. The document of claim 1, wherein a quotient of a width of the shield element to a width of the document is in a range from about 0.1 to about 0.8 or in a range from about 0.3 to about 0.6 or in a range from about 0.34 to about 0.57 or in a range from about 0.32 to about 0.55 or in a range from about 0.1 to 0.3 or in a range from about 0.16 to 0.28.

6. The document of claim 1, wherein an amount of overlapping of the antenna and the shield element and/or a width of the shield element depend on a thickness of the document.

7. The document of claim 1, wherein at least one of the shield element and the antenna comprises a metal material, e.g., AB13AL, aluminum and/or copper and/or silver.

8. The document of claim 7, wherein the shield element is formed by one of a metallic foil disposed over the support portion and a metallic ink printed onto the support portion.

9. The document of claim 7, wherein the shield element comprises a grid pattern having a line width in the range from about 100 µm to about 500 µm.

10. The document of claim 7, wherein the antenna is formed by one of a metallic foil disposed over the support portion and a metallic ink printed onto the support portion.

11. The document of claim 1, wherein the shield element and/or the antenna has a thickness of at most 100 µm.

12. The document of claim 1,
wherein the document is provided in form of a booklet having a booklet cover, the booklet cover corresponding to the support portion and comprising a front cover part, a back cover part and a booklet cover hinge, the front cover part and the back cover part being connected via the booklet cover hinge, and
wherein the shield element is arranged over one of the front cover part and the back cover part.

13. The document of claim 12, wherein the RFID inlay is of a size greater than the one of the front cover part and the back cover part, the RFID inlay being laminated together with the booklet cover and the shield element, the document further comprising an additional shield element, the additional shield element being arranged on the other one of the front cover part and the back cover part.

14. The document of claim 12, wherein the document has at most 32 pages enclosed by the booklet cover, and wherein a width of the shield element is greater than about 40 mm or greater than about 45 mm or equal to about 50 mm, depending on the number of pages.

15. The document of claim 12, wherein the document has more than 32 pages enclosed by the booklet cover, and wherein a width of the shield element is smaller than about 40 mm or smaller than about 35 mm or equal to about 30 mm, depending on the number of pages.

16. The document of claim 12, wherein the document has at most 32 pages enclosed by the booklet cover, and wherein a quotient of a width of the shield element to a width booklet cover is greater than about 0.22 or greater than about 0.25 or equal to about 0.28 or 0.29, depending on the number of pages.

17. The document of claim 12, wherein the document has more than 32 pages enclosed by the booklet cover, and wherein a quotient of a width of the shield element to a width of the booklet cover is smaller than about 0.22 or smaller than about 0.20 or equal to about 0.17, depending on the number of pages.

* * * * *